United States Patent [19]

Torche

[11] 4,398,695

[45] Aug. 16, 1983

[54] METAL SEAL STRUCTURE

[75] Inventor: Michael P. Torche, Garden Grove, Calif.

[73] Assignee: MCC Flowseal, Huntington Beach, Calif.

[21] Appl. No.: 335,429

[22] Filed: Dec. 29, 1981

[51] Int. Cl.³ .............................................. F16K 1/22
[52] U.S. Cl. .................................. 251/306; 251/173; 251/174; 137/72; 137/74
[58] Field of Search ..................... 137/72, 74; 251/173, 251/174, 306

[56] References Cited

U.S. PATENT DOCUMENTS

| | | | |
|---|---|---|---|
| 4,241,895 | 12/1980 | Sternenberg | 251/173 |
| 4,244,387 | 1/1981 | Snape | 137/72 |
| 4,272,054 | 6/1981 | Zinnai | 137/74 X |
| 4,373,543 | 2/1983 | Brown | 137/74 |

Primary Examiner—Harold W. Weakley
Attorney, Agent, or Firm—Kirkland & Ellis

[57] ABSTRACT

A sealing structure for use in valves, including butterfly valves, having a body with a flow passage and a movable valve disc in the flow passage. Two sealing surfaces are mounted in the body to engage the disc when it is in a closed position to provide a bubble-tight seal. The sealing structure includes an annular seal retaining cavity with a slot opening to the flow passage. A metal seal ring having a lip portion (which has a first seat) projecting through the slot into the passage is contained within the cavity adjacent to a primary heat-destructible seal ring, which has a second seat. The first seat and the second seat are engageable with the sealing surface of the disc to provide two axial seals. When the valve is closed, a radially-directed force is developed at the second seat (on the heat-destructible seal) and at the first seat (on the lip portion of the metal seal) in response to contact with the disc to effect a heat-destructible seal and a second, metal-to-metal seal, respectively. In another embodiment, a C-ring, O-ring, or other suitable support means is used in place of the heat-destructible seal to hold the metal seal in position. In this embodiment the metal-to-metal seal is the sole sealing means.

8 Claims, 10 Drawing Figures

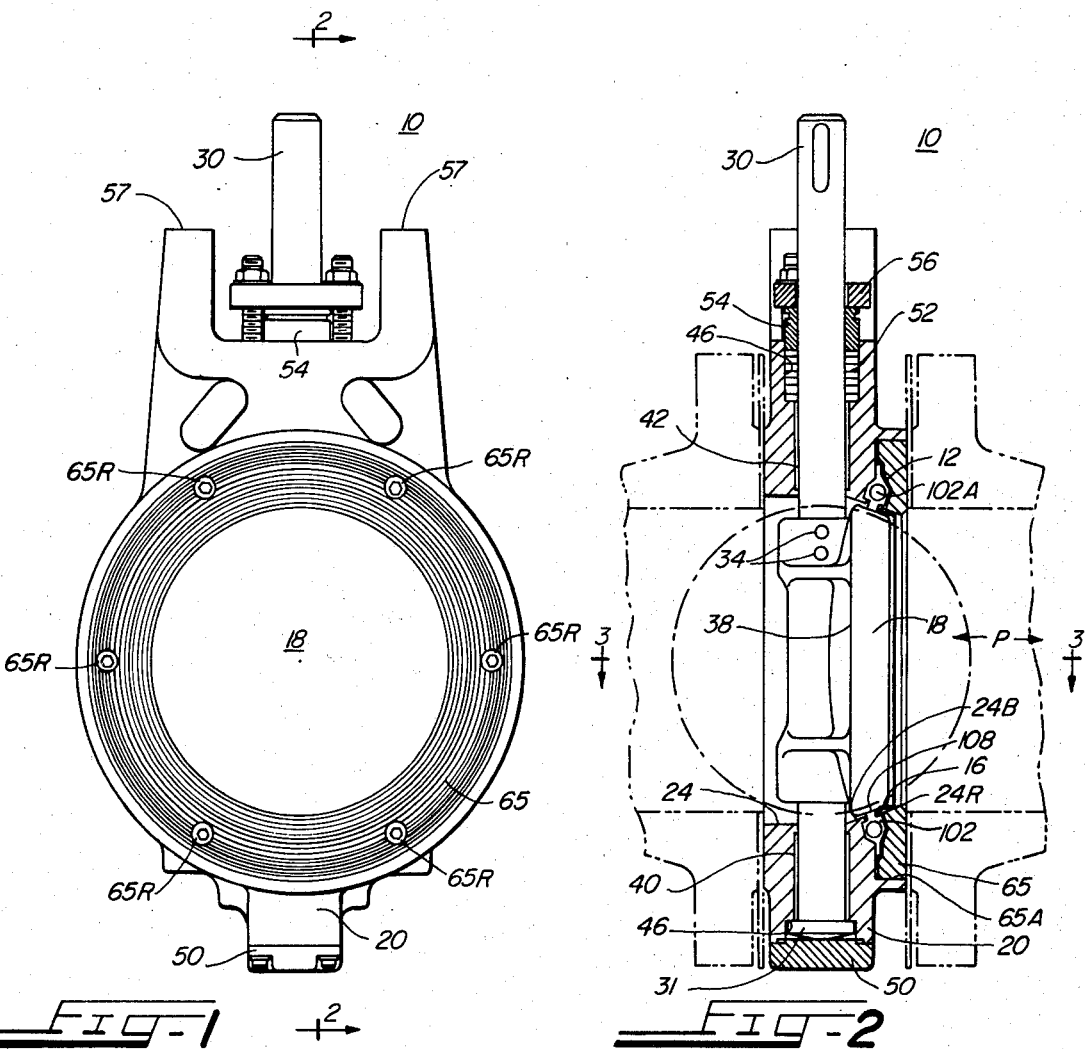
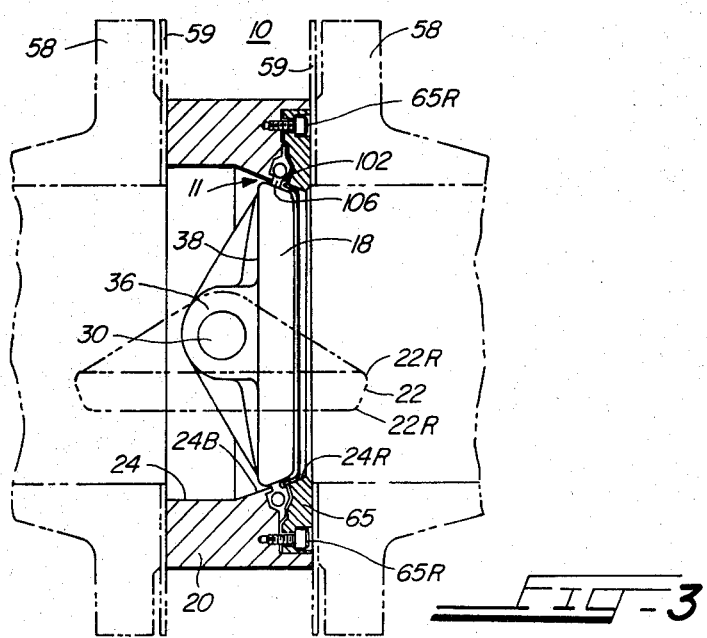

1

METAL SEAL STRUCTURE

BACKGROUND OF THE INVENTION

1. Field of the Invention

The present invention relates to a seal structure, and more particularly to an improved metal seal structure useful for fluid flow controlling devices such as butterfly valves operating in environments where high temperature excursions may cause failure of the primary heat-destructible sealing element or where high temperature fluids or fluids containing abrasive materials are being controlled.

2. Description of the Prior Art

A number of prior art patents describe various types of seal structures for butterfly valves. One such patent is U.S. Pat. No. 4,241,895—Sternenberg. The Sternenberg patent discloses a flexible annular metal seal 30 and a rigid retainer ring 36 that cooperates with the metal seal 30 to maintain a lip 30b in fluid-tight contact with a circumferential sealing surface 28 of a fluid control disc 26. The Sternenberg valve seal has an arcuate-shaped cross-section resembling a quarter of a torus, with one edge of the torus held in a position against a radial surface of the valve body by a retainer ring with the seal mounted as a cantilever. When the flow control element is closed it presses against the curved portion of the torus and moves the free edge of the torus against the surface of the retainer ring until the seal operates in the structural span mode. The Sternenberg seal operates in the cantilever mode as the flow control element is being closed, and operates in the structural span mode after the flow control element is closed. (See col. 2, lines 4–11)

Another prior art patent which discloses a device for effecting a seal is U.S. Pat. No. 4,220,172—Stager. In the Stager patent a seal is effected between a seating surface 41 of metal seating ring 36 and a sealing surface 32 of a valve disc 13. Interference between terminal edge 42 of seating ring 36 and ramps 43 and 44 formed in the wall of the passageway preloads seating surface 41 against sealing surface 32.

Other patents which disclose devices having lips for effecting a seal in cooperation with a disc member include: U.S. Pat. No. 4,175,578—Priese (lip portion 48 forms a seal in cooperation with a valve disc or element 26); U.S. Pat. No. 4,130,285—Whitaker (cantilever sleeve 84 having a sealing surface 86 forms a seal in cooperation with a disc 16); U.S. Pat. No. 3,986,699—Wucik, Jr. et al. (lip 28 forms a seal in cooperation with sealing surface 13 of valve disc 12); U.S. Pat. No. 4,231,546—Eggleston et al. (sealing portion 30 forms a seal in cooperation with surface 15 of closure member 14); and U.S. Pat. No. 3,834,663—Donnelly (lip 50 having a surface 52 forms a seal in cooperation with peripheral sealing edge 22 of disc 20). In addition, the Stager patent, the Priese patent, the Whitaker patent, and the Wucik patent disclose the combination of a lip type of secondary seal and a resilient, heat destructible primary seal member.

U.S. Pat. No. 4,266,752—Johnson discloses a seal structure utilizing a resilient annular ring contained within an annular cavity, which annular ring has a tongue which abuts against the valve disc to effect a seal. One embodiment of the present invention combines a primary, heat destructible seal ring of the type described in the Johnson patent with a metal seal ring to provide a second, metal-to-metal seal which allows the valve to continue to function in the event the primary seal fails, for example due to high temperatures. The metal seal has a unique configuration which both enhances its sealing effectiveness and cooperates with the cavity to maintain the primary seal in proper position for optimum performance. In another embodiment of the present invention, the metal seal is used without any primary, heat destructible sealing means of the type described in the Johnson patent.

SUMMARY OF THE INVENTION

A seal structure for providing fluid sealing between juxtaposed first and second members, such as a first member comprising a movable valve member or disc (in the case of a butterfly valve) having an annular peripheral sealing surface, and a second member such as a valve body having a substantially axial flow passage defined by an annular surface surrounding and normally slightly spaced from the disc; one of said members having an annular interior cavity of predetermined axial width opening to the passage through an annular radial slot at its surface, the annular radial slot being narrower than the cavity and being defined by sidewalls which are spaced apart in the axial direction. The cavity includes: a first interior sidewall extending radially from the slot; a second interior sidewall parallel to the first interior sidewall and having an axially extending flange forming a shoulder with its underside adjacent the slot, the second interior sidewall extending from the proximal end of the shoulder; radially extending and convergent interior sidewalls continuing from said respective parallel interior sidewalls; a first narrow anchoring recess extending from the ends of the convergent sidewalls; and a second narrow anchoring recess extending from the first anchoring recess. The interior of the main body portion of the cavity defines an annular opening of substantial cross-section.

An annular metal seal is positioned against one interior sidewall of the cavity and is clamped between two gaskets and between the retainer ring and the valve body in the second anchoring groove. The annular metal seal is provided with a metal seat on a lip projecting radially through said slot, the metal seat on the lip being engageable by the other of said members for sealing one axial side of the disc from the other when the disc is in the closed position. As discussed below, during normal operation the annular metal seal ring is positioned within the cavity adjacent to a heat-destructible primary seal, a metal C-ring, a metal O-ring, or other suitable support member.

In the preferred embodiment, a primary, heat-destructible annular sealing ring of Teflon or the like is retained in the cavity. This primary seal has: a main body portion with parallel sidewalls, one sidewall being spaced slightly away from one cavity interior sidewall and the other sidewall being adjacent to the annular metal seal ring; convergent walls abutting the interior convergent wall of the cavity on the one side and the annular metal seal ring on the other side; and a terminal extension from the convergent walls into the first anchoring recess, in which it is held in fluid-tight engagement. This primary seal has a tongue projecting through the slot into the passage, with a seat at the end of the tongue being engageable with the sealing surface of the disc for sealing one axial side of the disc from the other when the disc is in the closed position. The metal seal has a unique configuration which, in addition to positioning its metal seat to engage the disc for optimum sealing, provides structural support to retain the primary, heat-destructible seal in the cavity. During normal operation the main body portion of the heat-destructible seal also provides structural support to hold the metal seal near the cavity sidewall, as noted above. When the heat-destructible seal is destroyed so as to no longer provide any structural support to the metal seal, the metal seal will nevertheless continue to provide an axial seal.

In an alternative embodiment, the primary, heat-destructible seal is omitted and the metal seal is held in position against an interior sidewall of the cavity by an annular C-ring or O-ring, for example, that is compressed slightly between the seal and the opposite interior sidewall of the cavity. Other suitable support means also could be used to maintain the metal seal in position.

The metal seal of the present invention is suitable for use in high and low temperature environments, environments where there is a possibility of high temperature excursions, and to control fluids containing abrasive materials.

These and other objects, advantages and features will hereinafter appear, and for purposes of illustration, but not for limitation, exemplary embodiments of the present invention are illustrated in the accompanying drawings.

BRIEF DESCRIPTION OF THE DRAWINGS

FIG. 1 is an elevational view of a butterfly valve including a seal structure in accordance with the subject invention.

FIG. 2 is a diametrical, axial, vertical, cross-sectional view, taken along the line 2—2 of FIG. 1, of the valve in its closed position, showing it installed in a pipeline, the pipeline and the disc in its open position being shown only in phantom.

FIG. 3 is a diametrical, axial, horizontal, cross-sectional view of the valve taken along the line 3—3 of FIG. 2 with the valve closed but also showing, in phantom, the movable member (disc or vane) of the valve in its open position and the pipeline in which it is installed.

DETAILED DESCRIPTION OF THE PREFERRED EMBODIMENT

Figure 4:
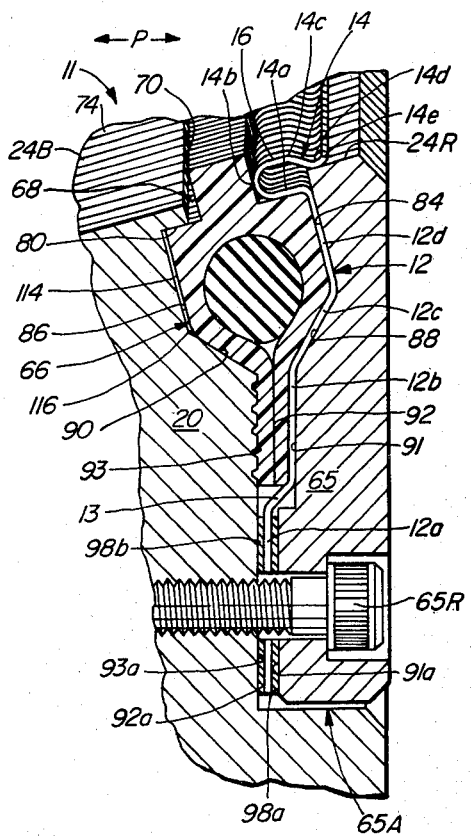
FIG. 4 is a cross-sectional view illustrating an embodiment of the valve having both primary (heat-destructible) and secondary (metal) sealing devices, with the valve disc in the open position.

Referring now to the drawings, and first to FIGS. 1, 2, 3 and 4, it will be noted that the seal structure 11 of the present invention has been illustrated in conjunction with a butterfly valve 10.

The sealed structure includes an annular metal seal ring 12, comprising a projecting tongue or lip portion 14 having a seat 16 facing and engageable with a disc or vane 18, as further described hereinafter. Lip portion 14 is juxtaposed between first and second members, the first member being a valve disc or vane 18 and the second the seal retainer ring 65. The preferred embodiment of the seal structure 11 also includes a heat-destructible seal ring 102 having a tongue 106 projecting through a slot 68 and also being adjacent to lip portion 14. Tongue 106 also faces and is engageable with the disc 18, as described in detail hereinafter.

Figure 5:
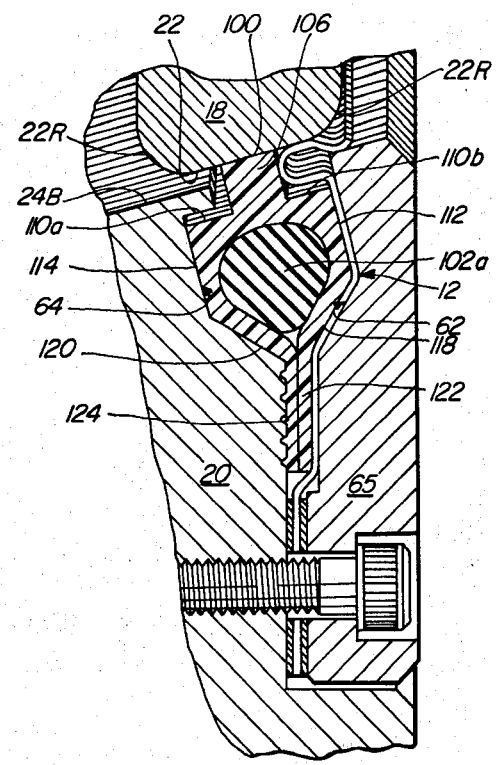
FIG. 5 is a cross-sectional view illustrating the embodiment of the valve illustrated in FIG. 4, but with the valve disc in the closed position.

The disc 18 is shown as a section of a sphere having a peripheral spherical sealing surface 22, with radii 22R at its edges. The disc 18 is movably mounted in a flow passage P through the valve, the fluid being able to flow and be controlled in either direction of flow. The flow passage includes an annular inner surface 24 (with portions 24R and 24B, as shown in FIGS. 4 and 5) juxtaposed to the edge of the disc 18 and, as illustrated, slightly spaced therefrom. Lip 14 and its seat 16 project into the space for engagement with the disc 18.

The valve disc 18 is rotatable by a shaft 30 attached by pins 34 to an elongated lug 36 at the back side 38 of the disc. The disc is axially displaced from the axis of rotation of the shaft 30 and the shaft axis is offset from the center of rotation of the spherical section of the disc periphery 22. The shaft 30 is journalled in sleeve bearings 40 and 42 projecting through body portions and contains shaft retainer 31 to prevent axial shaft movement. Axial movement of shaft retainer 31 is prevented by body counter base 46 and by bolted closure cap 50. It is surrounded by suitable conventional packing 52 including a gland 54 and follower 56 bolted to the body. The body also has upstanding yoke posts 57 for valve operating means (not shown). The valve body is mounted in a conventional manner between gaskets 59 on pipe flange 58, shown in phantom. The pipes may be considered to constitute part of the flow passage.

Referring now more particularly to FIGS. 4 and 5, the region of flow passage at the seal structure 11 is inclined somewhat as indicated by reference characters 24R and 24B so as to be tangent to the sealing surface 22 of the disc 18. Even though the flow passage is not truly axial but is inclined slightly (conical) it is referred to as extending axially. The region includes counterbores 62 and 64 in the seal retainer ring 65 and the body 20, respectively. The seal retainer ring 65 is retained in a counterbore 65A in the body 20 by screws 65R. High temperature gaskets 98a and 98b are positioned, respectively, between the seal retainer ring 65 and metal seal 12 and between the body 20 and the metal seal 12 to prevent external leakage. The counterbores 62 and 64 define a retaining cavity 66 for the metal seal ring 12 and a heat-destructible annular seal ring 102.

The cavity 66 has a generally longitudinal axis at approximately right angles to the sealing surface 22 of the disc 18. A radial slot 68 extends from the interior of the cavity into the flow passage, which is defined on one side by the opposed end wall 70 of flange 74 of counterbore 64 in the body 20, which form a part of the surfaces of the flow passage P and its portion 24B. The underside of the flange 74 forms shoulder 80. The opposite side of slot 68 is defined by radial sidewall 84 of counterbore 62.

The cavity 66 includes parallel spaced interior sidewalls 84 and 86 of counterbores 62 and 64, respectively, sidewall 86 extending radially from the proximal end of the shoulder 80 and sidewall 84 extending radially from surface 24R, and convergent interior sidewalls 88 and 90 continuing from said respective sidewalls 84 and 86. Interior walls 91 and 93 of the cavity extend from the ends of the convergent sidewalls forming a narrow anchoring recess 92. Interior walls 91a and 93a of the cavity extend from the ends of interior walls 91 and 93, respectively, forming a second narrow anchoring recess 92a, terminating at the outer periphery of the seal retainer ring 65. Recesses 92 and 92a are counterbores in the seal retainer ring 65 and body 20.

A metal seal ring 12, preferably made of a material which is not detrimentally affected by high temperatures, such as Inconel, Monel or stainless steel, includes an annular main body portion having sections 12a, 12b, 12c, and 12d which abut against the interior sidewalls 91a, 91, 88, and 84, respectively, of cavity 66. Two laminated graphite gaskets 98a and 98b provide a fluid-tight seal around the portion 12a of seal ring 12 within recess 92a.

As noted, metal seal ring 12 has a lip portion 14, which projects through the radial slot 68. The lip portion 14 is configured so as to provide an interference fit between seat 16 on portion 14c and the sealing surface 22 of disc 18. Lip 14 has a bend or corner at 14a, near slot 68, such that a portion of the lip 14 between 14a and 14b is generally perpendicular to interior sidewall 84 and body portion 12d. This configuration provides a shoulder which supports the heat-destructible seal 102, as discussed hereinafter. At 14b, lip 14 has an approximately 180-degree bend or corner so as to position the seat 16 to engage the sealing surface 22 of the disc 18. The distance between 14a and 14b is chosen so that seat 16 contacts the spherical portion of disc surface 22 and to provide a shoulder to support the primary, heat-destructible seal 102, as hereinafter described. If the seat 16 were to contact the disc 18 too near to the radius 22R, the valve might tend to exhibit undesirable "hair trigger" operation when being opened or closed. The portion of lip 14 at 14d slidably engages the frusto-conical surface 24R of seal retainer ring 65. The surface of lip 14 at 14d slides along the frusto-conical surface 24R as the fluid pressure applied to lip 14 and the rest of seal 12 varies and as the disc 18 is moved into its closed or opened positions. The end portion 14e curves away from the frusto-conical surface so as not to interfere with the sliding of the portion 14d against surface 24R. The foregoing configuration of lip 14 ensures that the metal seal is anchored at fulcrum point 13 (located between 12a and 12b) and that the point 14d of the lip remains slidably engaged with the frusto-conical surface 24R.

In the embodiment shown in FIGS. 4 and 5, the metal seal ring 12 is held in position against sidewall 84 and 88 by heat-destructible seal ring 102, the latter having an annular main body portion 104 fitting into the cavity 66. Seal ring 102 includes a tongue 106 projecting through slot 68 adjacent to lip 14, which tongue has a seat 108 for providing an interference fit with the sealing surface 22 of disc 18.

The primary, heat-destructible seal ring 102 is made of relatively rigid, ductile, corrosion-resistant material, such as Teflon, and the like. It has laterally extending shoulders 110a and 110b which are designed to abut lip 14 between 14a and 14b and the cavity interior shoulder 80, respectively. Thus, the bands or corners in lip portion 14 at 14a and 14b provide a shoulder which serves to hold seal 102 in the proper position for optimum sealing in conjunction with disc 18. The primary seal ring sidewalls 112 and 114 are parallel to portion 12d of the metal seal and cavity sidewalls 84 and 86, respectively. Sidewall 114 of seal ring 102 is spaced apart from cavity sidewall 86 to provide a space 116 into which the primary seal ring 102 can expand upon closure of disc 18. The sidewalls of the primary seal ring 102 are joined to convergent ring sidewalls 118 and 120, which in turn are joined to anchoring extension sidewalls 122 and 124, which are clamped in the anchoring recess 92 along with portion 12b of the metal seal.

As noted above, the configuration of the primary seal ring 102 includes the parallel (112 and 114), convergent (118 and 120), and anchoring (122 and 124) sidewalls. The exact configuration of primary seal ring 102 can be, for example, in the form described for the seal ring 12 in U.S. Pat. No. 4,266,752—Johnson (see col. 4, lines 12–68; col. 5, lines 1–59). The primary seal ring 102 also can include a core 102a of the type similar to core 124 described in the foregoing Johnson patent (see col. 4, lines 63–68; col. 5, lines 1–56). The manner of operation of primary seal ring 102 and the core 102a (if included) also is similar to the operation of seal ring 12 and core 124 described in the foregoing Johnson patent (see col. 6, lines 3–57). Thus, when the seat 108 of seal ring 102 and sealing surface 22 of disc 18 are engaged to close the valve, in the absence of fluid pressure, the seal ring 102 is appreciably radially compressed (somewhat flattened) and the tongue 106 remains substantially centered in slot 68 but is radially moved, the shoulders 110a and 110b are separated, the convergent surfaces 118 and 120 are forcibly abutted against the interior surface of section 12c of the fire-safe metal seal ring 12 and convergent cavity interior sidewall 90, respectively, and the main body portion 104 of the ring 102 is axially expanded so as to direct a seating force radially and effect sealing between the first and second members, i.e., surface 22 of the valve disc 18 and ring seat 108 of primary seal ring 102.

The seal structure 11 and valve 10 may be used to control flow in either direction. The angularity of the seal ring anchoring portion 12a, as earlier noted, may vary, the variation being determined primarily by the size of the valve. Generally, the smaller the valve and the diameter of the disc, the greater the angle. Further, should the Poisson effect be too great, e.g., produce too tight a seal with fluid flow, the effect can be controlled by varying proportions of the materials, such as the thicknesses of the core 102a, which can be contained within body 104, and the wall structure of primary seal ring 102. It has been found that the same seal ring 102 dimensions, much as indicated in the drawings, except for different annular diameters of the cavity, tongue and shoulders can be used for various sizes of valves. The seal structure of seal ring 102 operates under both low and high pressures.

In the embodiment illustrated in FIGS. 4 and 5, primary heat-destructible seal ring 102 provides a first axial seal between seat 108 and sealing surface 22 during normal operation, while seat 16 on the lip 14 of metal seal ring 12 provides a second axial seal. Either primary seat 108 or secondary seat 16 is capable of providing bi-directional shut-off. The primary seal is effected in the manner described in the above-referenced Johnson patent. As differential pressure across the valve increases, both seat 108 and seat 16 generate additional sealing force against the disc surface 22. Seal ring 12 operates to maintain an axial seal in the event high temperatures or other conditions destroy primary seal ring 102. The lip portion 14 of annular seal 12 is configured so that, in addition to serving to hold primary seal ring 102 in position, a spring force and a "hoop load" force are provided between seat 16 and disc surface 22 to maintain an axial seat at all times when the disc is closed. The hoop load force arises from the stretching of metal seal ring 12 that occurs when the slightly larger diameter disc 18 is closed into metal seat 16 at 14c on lip 14 of metal seal ring 12. The spring force arises from the resilience of the seal ring 12 as it interacts with the frusto-conical surface and the fulcrum point 13, which is located at the clamping joint at the edge of gaskets 98a and 98b.

In the preferred embodiment having both a primary and a secondary seal, when fluid pressure is applied from the retainer side of seal structure 11 (see FIG. 6), line pressure causes fluid to enter the space between the metal seal 12 and the seat retainer 65. As differential pressure across the seal structure 11 increases, the metal seal 12 is forced against the primary seal 102 compressing the main body portion 104 of the primary seal 102 against the opposing cavity sidewall 86.

The movement of the lip 14 of the metal seal 12 into the seal retaining cavity 66 is made about a fulcrum point 13. Pivoting of the metal seal structure about fulcrum point 13 causes increased interference between metal seat 16 and the sealing surface 22 of the disc 18. The increase in interference is due to the location of the fulcrum point with respect to the point of contact (i.e., metal seat 16, which is located at 14c) between the disc 18 and lip 14. That is, as metal seal 12 pivots about point 13, metal seat 16 is urged more tightly against disc surface 22. As metal seal 12 pivots about point 13, contact is maintained at point 14d of metal lip 14 with the frusto-conical surface 24R due to the outwardly directed force generated by the reaction of the lip 14 against the disc surface 22, which insures that the increased interference is maintained.

In conjunction with increasing the sealing force of the metal seat 16 against the disc surface 22, the deflection of the metal seat 16 and resultant pivoting of metal seal 12 (counterclockwise in FIGS. 4-10) causes the heat-destructible seal 102 to be urged more forcefully against the opposing interior sidewall 86. As the difference in pressure between the upstream (retainer) side and the downstream (body) side increases, the axial force exerted upon the heat-destructible seal 102 by fluid pressure against metal seal 12 generates a radial, inward Poisson force (as discussed more fully below) which increases the sealing force by pushing tongue 106 against the sealing surface 22 of disc 18.

Similarly, in the preferred embodiment having both a primary and a secondary seal, when fluid pressure is applied from the body side of seal structure 11 (see FIG. 7), line pressure enters the cavity 66 in the space 116 between the main body portion 104 of heat-destructible seal 102 and the sidewall 86 of the valve body 20. As the differential pressure across the seal structure 11 increases, the body portion 14 of the heat-destructible seal 102 is forced againt the metal seal 12, which is abutted by the sidewall 84 of the seat retainer ring 65.

The axial compression of the ductile body portion 104 of heat-destructible seal 102 generates a Possion force on the tongue 106 of the heat-destructible seal 102 which increases the sealing force between the tongue 106 and surface 22 of disc 18.

The compression of the ductile primary seal 102 against the metal seal 12 also causes the lip portion 14 of the metal seal to slide up the frusto-conical surface 24R of the seat retainer 65. As point 14d of the lip structure slides to the right on the retainer ring surface 24R, the force with which metal seat 16 is urged against the disc surface 22 is increased due to the geometry of the frusto-conical surface, as can be seen from FIGS. 4-10. That is, as the lip 14d moves to the right, point 14d slides up an incline, which urges metal seat 16 against disc surface 22.

Figure 6:
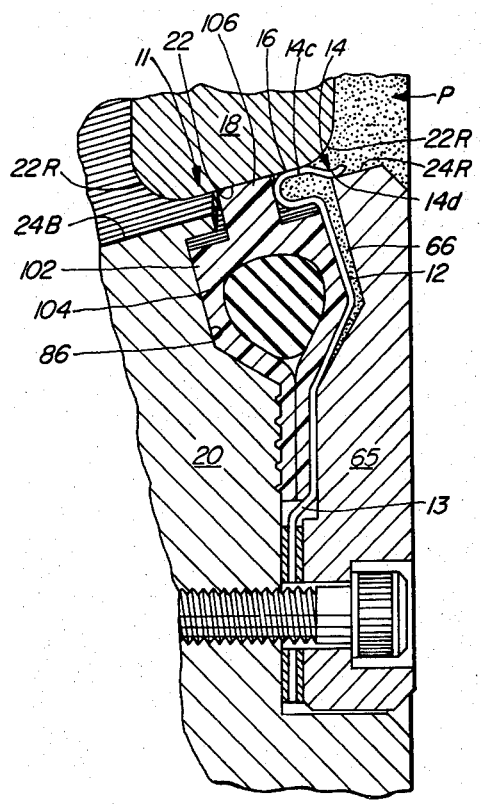
FIG. 6 is a cross-sectional view illustrating the embodiment of the valve illustrated in FIG. 4, but with the valve disc in the closed position with fluid pressure from the retainer side of the valve.
Figure 7:
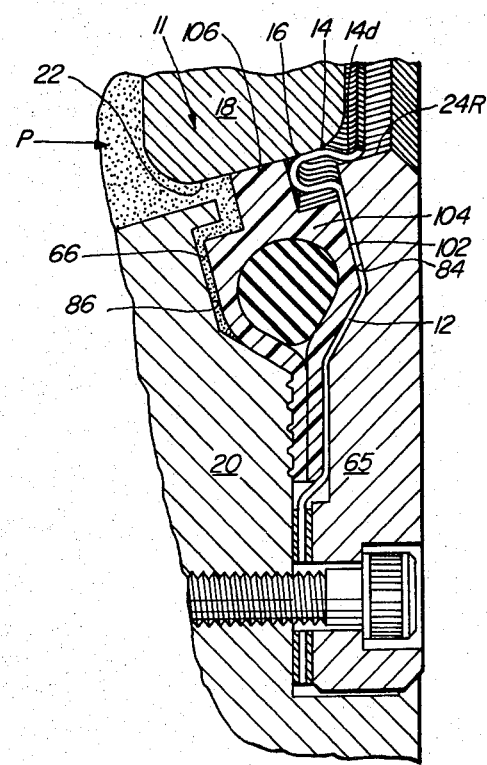
FIG. 7 is a cross-sectional view illustrating the embodiment of the valve illustrated in FIG. 4, but with the valve disc in the closed position with fluid pressure from the body side of the valve.
Figure 8:
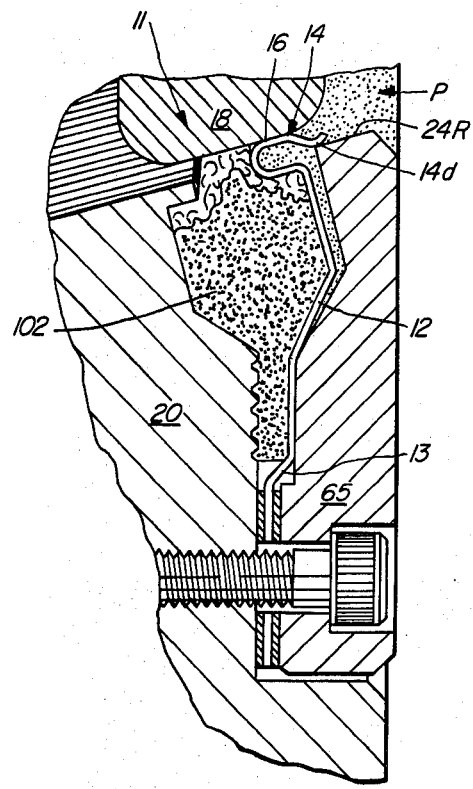
FIG. 8 is a cross-sectional view illustrating the embodiment of the valve illustrated in FIG. 4, but with the valve disc in the closed position with fluid pressure from the retainer side of the valve, wherein the primary seal has been destroyed.

FIG. 8 illustrates the same embodiment and direction of fluid pressure (i.e., from the retainer side of the valve structure 11) as illustrated in FIG. 6, but with the primary seal 102 destroyed (by a fire, for example). With primary seal 102 destroyed, the metal seat 16 of the lip 14 of metal seal 12 continues to maintain contact with the sealing surface 22 of the disc 18. With little or no line pressure, the spring force and the hoop load, as described above, of the lip 14 provide metal-to-metal sealing. Higher line pressures fill the area between the metal seal 12 and the retainer 65. The geometry of the metal seal 12 loads the metal seat 16 against the surface 22 of the disc 18, since, as metal seal 12 pivots about point 13, metal seat 16 is urged more tightly against disc surface 22, maintaining contact between point 14d and surface 24R as the lip slides right or left in FIGS. 4-10. The higher the pressure, the higher the sealing force. Metal seat 16 of metal seal 12 will continue to provide an axial seal without any support from primary seal 102 (i.e., after primary seal 102 has been destroyed).

Figure 9:
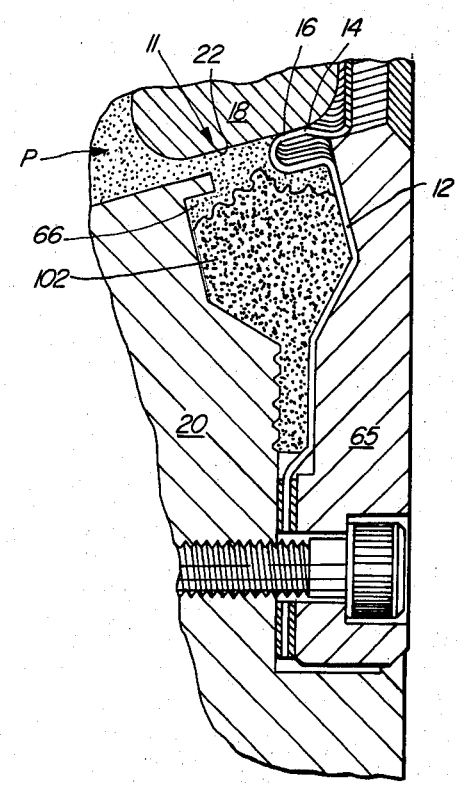
FIG. 9 is a cross-sectional view illustrating the embodiment of the valve illustrated in FIG. 4, but with the valve disc in the closed position with fluid pressure from the body side of the valve, wherein the primary seal has been destroyed.
Figure 10:
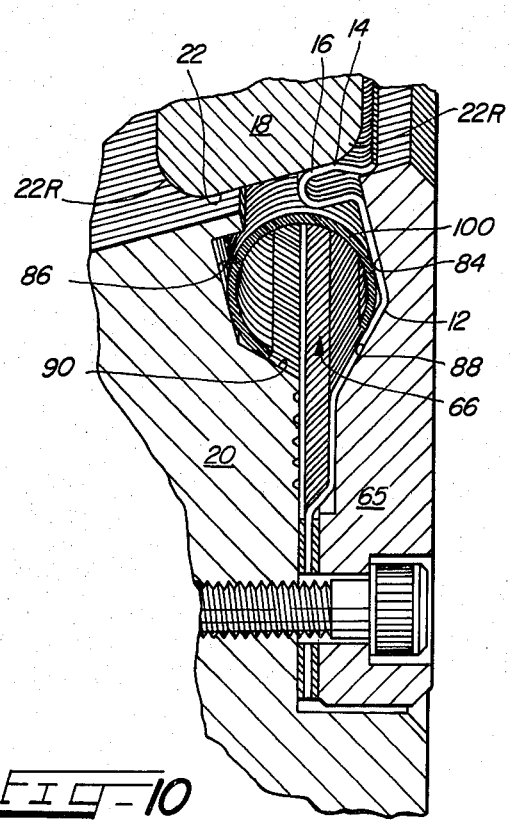
FIG. 10 is a cross-sectional view illustrating an embodiment of the valve, with the valve disc in the closed position, having an annular metal seal supported by a C-ring, which effects an axial seal only by means of the annular metal seal.

FIG. 9 illustrates the same embodiment and direction of fluid pressure (i.e., from the body side of the valve structure 11) as illustrated in FIG. 7, but with the primary seal 102 destroyed. As with the configuration of the valve illustrated in FIG. 8, the primary seal 102 need not be either intact or wholly destroyed in order to establish or maintain a metal-to-metal seal between metal seat 16 and disc surface 22. With little or no pressure the metal seat 16 seals by spring and hoop forces, as described above. Higher line pressure deflects axially the disc 18 closer to the metal seat 16, and line pressure in the retaining cavity 66 forces the metal seat 16 into tighter contact with the disc surface 22 as the lip 14 slides along the frusto-conical surface of the retainer 65. Higher pressures provide higher sealing forces.

Due to the offset shaft configuration, there is significantly more of the disc 18 on one side of the shaft than on the other. This produces a reinforced plate structure on one side (i.e., on the right side of shaft 30 in FIG. 3) and a half cylinder on the other (i.e., on the left side of shaft 30 in FIG. 3). Thus, under uniform pressure loading from the right in FIG. 3, the total structure is inherently stronger than under uniform pressure loading from the left. Consequently, there is significantly greater axial deflection when line pressure is applied to the backside of disc 18 (i.e., from the left in FIG. 3) than when line pressure is applied from the front side of the disc 18 (i.e., from the right in FIG. 3). Consequently, this relatively greater amount of axial shift of disc 18 assists in effecting the seal when fluid is applied from the body side of the valve (i.e., from the left as illustrated in FIGS. 7 and 9). On the other hand, the relatively lesser amount of axial deflection of disc 18 which occurs when fluid is applied from the retainer side of the valve (i.e., from the right as illustrated in FIGS. 6 and 8) does not significantly inhibit achieving a metal-to-metal seal when fluid pressure is applied from that direction.

In another embodiment, primary seal ring 102 is omitted and the backup seal ring 12 is held in position against sidewalls 84 and 88 by a suitable support ring such as, for example, an annular C-ring 100 (see FIG. 10), O-ring (not shown) or a solid ring having another configuration (not shown), which is slightly compressed between seal ring 12 on the one side and, on the opposite side, interior sidewall 86 and convergent interior sidewall 90, so as to provide sufficient force to hold seal ring 12 firmly in position adjacent interior sidewall 84 and convergent interior sidewall 88 in the cavity 66. In this embodiment, a metal-to-metal, axial seal capable of withstanding high temperatures is provided between seat 16 and disc surface 22.

While the preferred embodiment of the invention has been illustrated and described, it is to be understood that the invention is not limited to the precise construction herein disclosed, and the right is reserved to all changes and modifications coming within the scope of the invention as defined in the appended claims.

I claim:

1. A seal structure for providing primary and secondary sealing of fluid between juxtaposed first and second members;

the first member having an annular peripheral sealing surface;

the second member having an annular surface normally slightly spaced from the first member;

one of said members having an annular interior cavity with an opening to its surface;

the cavity including sidewalls and a narrow anchoring recess extending from the ends of the convergent sidewalls;

a first annular seal ring mounted in said cavity having a main body portion with one side thereof adjacent to a cavity interior sidewall, said annular seal ring having an anchor portion extending from the main body portion into the anchoring recess and maintained in sealing relationship therein, said annular seal ring also having a lip radially projecting through said cavity opening and having a seat on the periphery of said lip engageable by the other of said members, said lip having a portion in sliding engagement with a surface on the one of said members having said cavity;

a second seal ring of relatively rigid, ductile material mounted in said cavity and having a main body portion, said second seal ring having an anchor portion extending from the main body portion into the anchoring recess and maintained in sealing relationship therein, said second seal ring also having a tongue radially projecting through said cavity opening and terminating in a seat engageable by the other of said members; and the dimensions of the cavity and seal structures being such that when the seat on said lip portion of said first seal ring is engaged with the sealing surface the first seal ring is radially compressed and the lip is radially moved and the resulting radial compression operates the lip to effect sealing between said first and second members, and when the seat on the tongue of said second seal ring is engaged with the sealing surface the second seal ring is radially compressed and the tongue is radially moved and the resulting radial compression effects sealing between the first and second members.

2. A seal structure as claimed in claim 1 wherein the anchoring recess and the extensions therein of said first annular seal ring and said second seal ring are disposed in a direction other than perpendicular to said annular peripheral sealing surface.

3. The seal structure as claimed in claim 1 wherein said cavity also includes a shoulder which retains one side of said second seal ring in said cavity and wherein a portion of said lip of said first seal ring retains the other side of said second seal ring in said cavity.

4. The seal structure as claimed in claim 1 wherein the main body portion of said second seal ring has in its interior an annular opening of substantial cross-section providing for radially and axially directed forces and movement of the main body portion, and further comprising a normally substantially tension-free elastomeric core of corresponding cross-section substantially filling said opening, whereby the seat on the tongue of said second seal ring more tightly engages the sealing surface in the presence of fluid pressure.

5. A seal structure for providing fluid sealing between juxtaposed first and second members;

the first member having an annular peripheral sealing surface;

the second member having an annular surface surrounding and normally slightly spaced from the first member;

one of said members having an annular interior cavity with a radial slot opening to its surface and which is narrower than the cavity;

the cavity including an axially extending underside shoulder adjacent the slot on the one side and a first interior sidewall portion extending radially from the slot on the other side, a second interior sidewall portion extending radially from the distal end of the shoulder, generally radially extending and convergent interior sidewall portions continuing from said respective first and second sidewall portions, and a narrow anchoring recess extending from the ends of the convergent sidewall portions;

an annular seal ring mounted in said cavity having a main body portion with one side thereof adjacent to one cavity interior sidewall, the ring having an extension from the main body portion into and sealed to the anchoring recess, the ring also having a lip radially projecting through said slot and having a seat engageable by the other of said members, the lip having a portion in sliding engagement with a surface on the one of said members having said cavity;

an annular support ring located in said cavity adjacent to the main body portion of said annular seal ring for holding said annular seal ring against another cavity interior sidewall; and the dimensions of the cavity and seal structures being such that when the seat on said lip portion is engaged with the sealing surface, the annular metal seal ring is radially compressed and the lip is radially moved and the resulting radial compression of the lip effects sealing between said first and second members.

6. The apparatus as claimed in claim 5 wherein said annular support ring comprises an annular C-ring.

7. The apparatus as claimed in claim 5 wherein said annular support ring comprises an annular O-ring.

8. The apparatus as claimed in claim 5 wherein said annular support ring comprises a primary seal ring of relatively rigid, ductile material mounted in said cavity and having a main body portion, said primary seal ring also having an extension from the main body portion into and sealed to the anchoring recess, said primary seal ring also having a tongue radially projecting through and movable in the radial slot in said annular interior cavity and terminating in a seat engageable by the other of said members so as to effect a seal.

* * * * *